(12) United States Patent
Zimmer

(10) Patent No.: US 9,045,111 B2
(45) Date of Patent: Jun. 2, 2015

(54) WINDSCREEN WIPER DEVICE

(75) Inventor: Joachim Zimmer, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 13/808,277

(22) PCT Filed: May 10, 2011

(86) PCT No.: PCT/EP2011/057452
§ 371 (c)(1),
(2), (4) Date: Jan. 4, 2013

(87) PCT Pub. No.: WO2012/004023
PCT Pub. Date: Jan. 12, 2012

(65) Prior Publication Data
US 2013/0104333 A1 May 2, 2013

(30) Foreign Application Priority Data
Jul. 6, 2010 (DE) .......................... 10 2010 030 961

(51) Int. Cl.
*H02K 33/00* (2006.01)
*B60S 1/08* (2006.01)

(52) U.S. Cl.
CPC .......................... *B60S 1/08* (2013.01)

(58) Field of Classification Search
CPC .................................................. H02P 25/027
USPC ............ 318/443, 119, 231, 431, DIG. 2, 280, 318/281, 127, 445, 283, 120, 400.15, 430, 318/432
See application file for complete search history.

(56) References Cited

U.S. PATENT DOCUMENTS

| | | | | |
|---|---|---|---|---|
| 5,355,061 A | * | 10/1994 | Forhan | 318/443 |
| 5,642,026 A | * | 6/1997 | McCann et al. | 318/806 |
| 5,757,155 A | | 5/1998 | Autran et al. | |
| 5,808,187 A | * | 9/1998 | Gooden et al. | 73/114.56 |
| 5,811,950 A | * | 9/1998 | Lawson | 318/484 |
| 5,852,352 A | * | 12/1998 | Suriano | 318/541 |

(Continued)

FOREIGN PATENT DOCUMENTS

| CN | 1796812 | 7/2006 |
|---|---|---|
| DE | 10159446 | 10/2003 |
| DE | 102006050659 | 4/2008 |

(Continued)

OTHER PUBLICATIONS

PCT/EP2011/057452 International Search Report dated Aug. 1, 2011 (English Translation and Original, 6 pages).

*Primary Examiner* — Rita Leykin
(74) *Attorney, Agent, or Firm* — MIchael Best & Friedrich LLP

(57) ABSTRACT

A windscreen wiper device (I) for a motor vehicle. The device includes at least one wiper motor (2) on which a motor crank (4) is provided connected to at least one gearing (3) which is downstream of said wiper motor (2), so as to drive a wiper arm that is coupled thereto such that said arm performs an oscillating wiper movement on a windscreen of said motor vehicle, said wiper motor (2) being coupled to a control unit. Motor power generated by the wiper motor (2) is adjusted by the control unit depending on a transmission ratio which results from the position of said gearing (3). The control unit delays a reduction in the motor power until after the motor crank (4) has accelerated out of the respective wiper arm turning points to produce as uniform a wiper arm movement as possible on the windscreen.

19 Claims, 4 Drawing Sheets

(56) References Cited

U.S. PATENT DOCUMENTS

| | | | | |
|---|---|---|---|---|
| 6,040,667 | A * | 3/2000 | Watts | 318/280 |
| 6,281,649 | B1 * | 8/2001 | Ouellette et al. | 318/443 |
| 7,166,979 | B2 * | 1/2007 | Zimmer | 318/443 |
| 7,895,702 | B2 * | 3/2011 | Tisch et al. | 15/250.17 |

FOREIGN PATENT DOCUMENTS

| | | |
|---|---|---|
| WO | 9829285 | 7/1998 |

* cited by examiner

WINDSCREEN WIPER DEVICE

BACKGROUND OF THE INVENTION

The present invention concerns a windscreen wiper device for a motor vehicle with at least one wiper motor, in particular a reversing motor, on which is provided a motor crank which is connected with at least one gearing connected downstream of the wiper motor in order to drive a wiper arm coupled therewith such that it executes an oscillating wiping movement on a windscreen of the motor vehicle, wherein the wiper motor is coupled with a control unit to control the wiping movement, by means of which unit a motor power generated by the wiper motor can be adjusted as a function of a position of the gearing or wiper arm on the windscreen. The invention furthermore concerns a method for controlling the windscreen wiper device.

Such a windscreen wiper device is known for example from document DE 101 44 985 A1. This document discloses a method to control a windscreen wiper device in which the motor power of the wiper motor is controlled as a function of a translation ratio resulting from the position of the gearing, and the motor power and a torque acting on the gearing or the wiper arm are adapted to the power required to carry out the wiping movement of the wiper arm. For this the torque which can be emitted by the wiper motor at any time is determined taking into account the gearing ratios and thus effectively prevents an overload of the wiper motor for example due to snow or ice on the windscreen, as blocking of the windscreen wiper device because of the large masses to be moved can be prevented. The windscreen wiper device reacts particularly sensitively to such masses shortly before reaching the turning positions of the wiper arms in which the wiping direction of the wiper arm reverses. In the turning positions however usually a substantially lower moment is required to drive the wiper arm. In the known wiper system with electronically controlled torque limitation in the prior art therefore, in the wiper arm turning positions the torque is reduced according to need, wherein the demand results substantially from the course of the translation ratio of the wiper linkage or gearing. Because of this control, in the event of blocking a reduced system load occurs which is uniform across the working region.

On acceleration of the wiper arm or motor crank from the turning positions, it must also be ensured that sufficient power can be provided by the wiper motor. The wiper motor must be brought up to higher rotation speed ranges as quickly as possible after reversing.

The power of wiper motors and in particular their starting torques are designed taking into account so-called worst case peripheral conditions, such as for example a drying windscreen, maximum possible wiper arm contact force etc., in order to ensure perfect wiping operation of the windscreen wiper device in this case too. This leads to motors with very high torque, the starting torque of which forms the basis for the dimensioning of the mechanical components of the wiper motor or drive linkage of the windscreen wiper device and the wiper arm. This undeniably leads to individual components having to be dimensioned correspondingly large in order to be able to tolerate the maximum forces, which leads to a higher weight and higher costs.

SUMMARY OF THE INVENTION

It is therefore the object of the present invention to provide a windscreen wiper device, control of which allows optimum adaptation to the actual torque demand of the windscreen wiper device with simultaneous minimum load on the system and which at the same time enables the oscillating wiping movement of the wiper arm on the windscreen to be as uniform as possible.

According to the invention, in order to carry out dynamic reversing processes of the wiper arm out of at least one of the turning positions, to generate as uniform a wiper arm movement as possible on the windscreen, the control unit delays a reduction in the motor power until after the motor crank has accelerated out of the respective turning point. Only when the operating speed of the wiper motor has been reached is a reduction in motor power initiated by the control unit. Thus an undesirable extension of the time required for a complete wiping cycle of the wiper arm on the windscreen can be countered. If the motor voltage or torque were reduced shortly before reaching the operating speed, the motor—even without additional load such as snow and ice—would, during the start-up phase after passing through a turning point, lack the power to overcome its own inertia and reach its desired nominal speed, which would also lead to a delay in the wiping cycle.

In other words, the control of the windscreen wiper device proposed according to the invention can reduce the maximum load on the windscreen wiper device in all critical blocking cases. At the same time, dynamic reversing processes are carried out for normal operation of the windscreen wiper device.

This is further supported in that the elasticity of the wiper is taken into account and thus a temporally adapted control of maximum motor power and torque reduction achieved taking into account the demand for acceleration and motor torque, and at the same time blocking protection is provided.

As a result a windscreen wiper device is provided with optimized acceleration capacity of the wiper arm with simultaneous torque reduction of the wiper motor, which substantially reduces in particular the wear susceptibility of these components within the windscreen wiper device. As a result of this measure therefore firstly it is possible to reduce the maximum load on the mechanical components of the windscreen wiper device, which automatically leads to a saving in costs and weight of the entire system as smaller dimensions can be selected for this.

On reversing, the full motor power of the wiper motor is required to overcome motor and system inertia rapidly and achieve as smooth a movement process as possible. On reaching the operating speed and hence at the start of the delay according to the invention, the motor crank and hence the wiper arm coupled therewith can cover an angle of typically 15 to 20° out of the turning points.

A particular simple possibility of carrying out dynamic reversing processes of the wiper arm on the windscreen is achieved in that to reduce the motor power or torque of the wiper motor, a torque/power curve is stored in the control unit which constitutes an approximation of the actual moment demand group. The motor power of the wiper motor can be reduced for example by limiting the current or voltage.

The highest loads in the windscreen wiper device occur on a blockage of the windscreen wiper device shortly before reaching one of the turning positions of the wiper arm. In the worst case the wiper motor at this point comes to a standstill precisely in the parked or fully upright position, whereby the maximum drive moment acts on the wiper system in the region of the smallest translation ratio. To prevent this, in one embodiment example, the wiper motor can be controlled electronically and has a position and rotation direction detection which ensures that the control unit continuously receives data on the position of the wiper arm on the windscreen and drives the wiper motor according to the stored curve. In this way the combination of full load and brief stoppage of the motor crank or wiper arm in the turning point can be reliably countered. An embodiment example of the present invention provides that the position and rotation direction detection are achieved by at least one sensor arrangement.

To allow a particularly secure monitoring of the wipe cycle and the states of the individual wiper components, in one embodiment example it is provided that the control unit is kept ready for operation in all operating states of the windscreen wiper device and the control unit is activated on detection of even low rotation speeds of the wiper motor.

A method according to the invention for controlling a windscreen wiper device according to the invention for a motor vehicle provides that a curve is stored in the at least one control device which is coupled with the wiper motor to control a motor power, generated by the wiper motor to drive the motor crank, as a function of a translation ratio resulting from the position of the gearing, and adapt the motor power and a torque acting on the gearing or wiper arm according to the course of the curve, wherein to achieve as uniform as possible an oscillating wiping movement of the wiper arm on the windscreen of the motor vehicle, the torque or motor power is reduced only after the motor crank or wiper arm has accelerated out of at least one of the turning points of the wiper arm.

Here the curve, in particular in the turning points of the wiper arm on the windscreen of the motor vehicle, can take into account the inertia of the wiper motor or further relevant components of the windscreen wiper device in determining the torque to be applied by the wiper motor to the motor crank.

A further factor which plays a role for determining the curve of the control device is the elasticity of the individual components of the windscreen wiper device. Therefore it is proposed according to the invention to take into account also the elasticity of the individual components in setting the course of the curve or voltage adaptation.

On blocking of the wiper arm in the park position and initiation of maximum motor torque, because of the elasticity of the components of the windscreen wiper device, the motor stops and hence a blockade of the wiper system occurs only after a twist of the motor crank through typically 30°, a typical angle which is necessary to create an internal load in the wiper system. As a result it appears sensible to design the wipe cycle so that the wiper motor first starts with full power and only after passing through the wipe angle is the power adapted so flexibly that in the position of the first possible blockade, the torque of the wiper motor has already been reduced to a suitable angle. On blocking of the wiper arm after passing through one of the turning points, the elasticity of the components of the windscreen wiper device ensures that the motor crank can turn a few degrees further, normally by a value of between 25 to 35°, before the wiper motor comes to a stop and its maximum starting torque acts on the wiper system. In this state advantageously the translation ratio in the gearing already begins to rise again in relation to the state in the turning points, whereby the load on the entire system on a blockade is lower.

In the further course of the wipe cycle it is suitable to increase the motor power again, since around the mid-point of the wipe field, because of the translation ratio of the wiper linkage, even in normal operation already the maximum motor power or maximum motor torque is required. In this region any blocking forces occurring are however comparatively low, so the dimensioning of the individual components can be selected smaller because the maximum loads occurring have been approximated optimally in comparison with the prior art.

BRIEF DESCRIPTION OF THE DRAWINGS

This shows.

DETAILED DESCRIPTION

Figure 1:
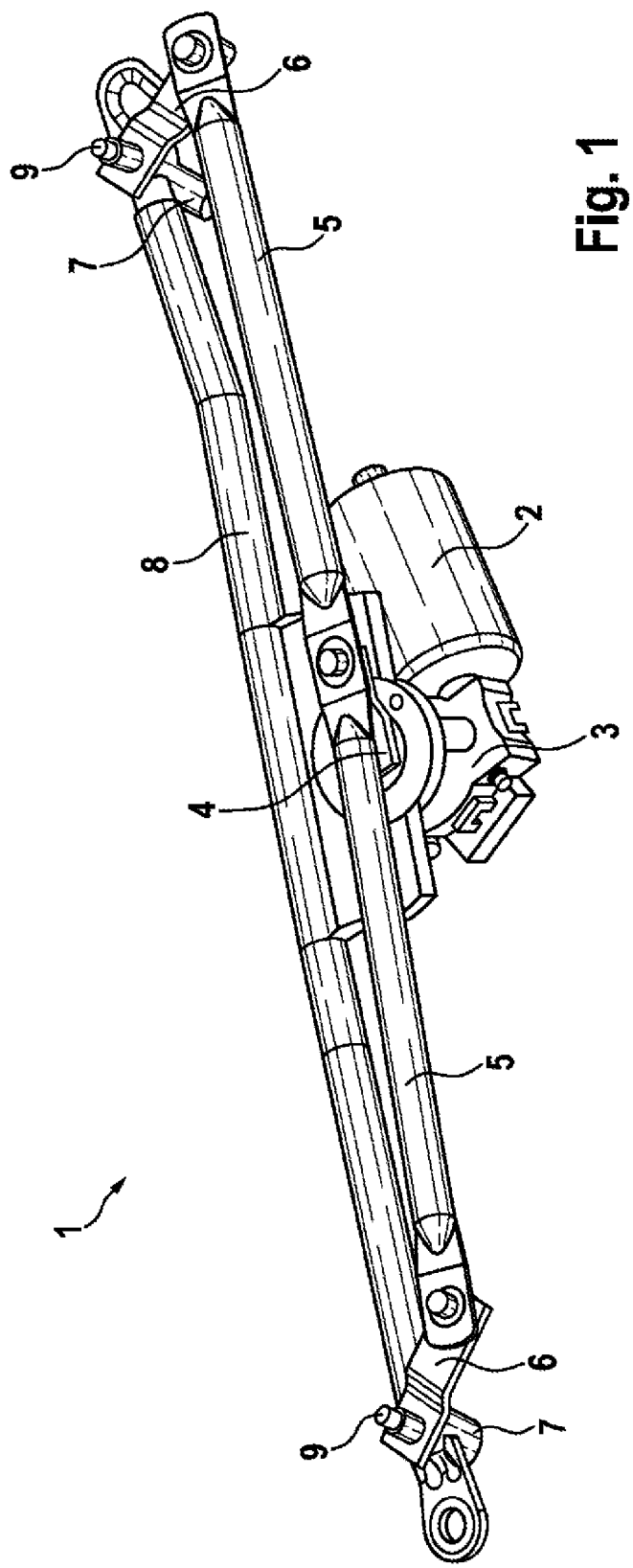
FIG. 1—a schematic partial depiction of an embodiment example of a windscreen wiper device according to the invention.

FIG. 1 shows a perspective view of a windscreen wiper device. The windscreen wiper device 1 essentially comprises a wiper motor 2 which via a gearing 3—not shown in more detail—drives an output shaft. The output shaft is connected rotationally fixed with a motor crank 4 which transfers the torque it receives to two connecting rods 5. The connecting rods 5 are connected rotationally mobile at their one end with the free end of the crank 4 and at their other end via an output crank 6 with a wiper bearing 7.

The wiper bearings 7 in turn are connected together via a tube plate 8. The wiper bearings 7 each have a wiper shaft 9 which carries wiper arms with wiper blades not shown here. The output cranks 6 are connected rotationally fixed with the wiper bearings 7 or wiper shafts 9 so that a thrust movement of the connecting rods 5 is translated into an oscillating rotary movement via the output cranks 6 at the wiper shafts 9.

Figure 2:
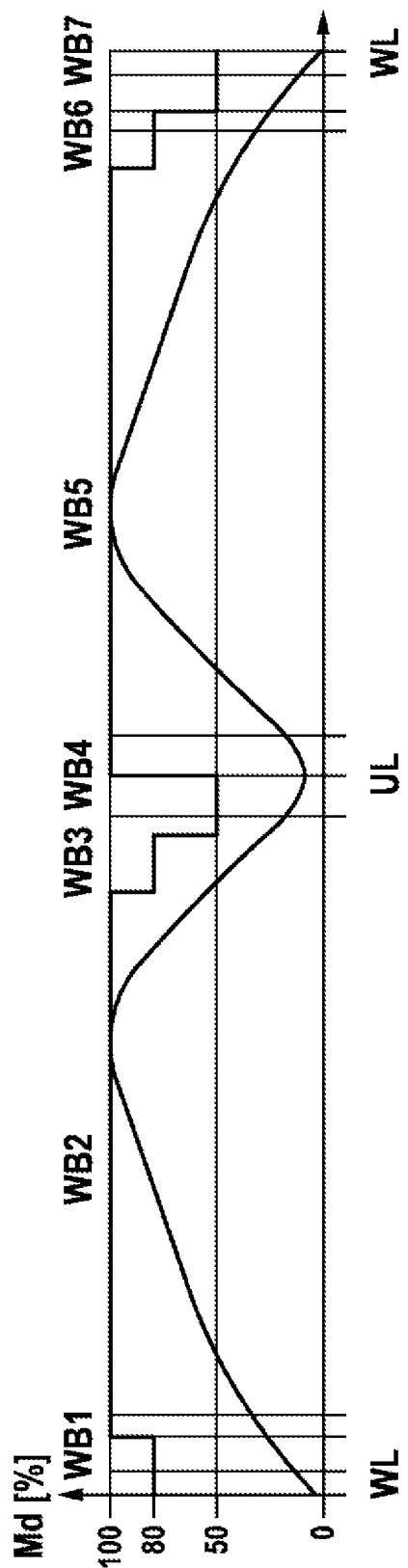
FIG. 2—a diagram of a torque demand and a torque limitation over an angular position of a wiper arm of the windscreen wiper device according to the invention.

FIG. 2 shows a diagram of the torque demand and torque limitation of the windscreen wiper device 1 according to FIG. 1 over the angular position of a wiper arm moving over the windscreen of a motor vehicle. The depiction is divided into various segments WB1 to WB7 along the X axis, and for each of these angular regions WB1 to WB7 a specific maximum torque is established. The angular regions WB1 to WB7 are depicted as an example of the deflection of the wiper arm on the windscreen of the motor vehicle or the motor crank 4 of the windscreen wiper device 1.

In the first angular region WB1, the motor crank moves out of the park position up to an angle of for example 10 to 20°. In this region the torque which can be emitted is limited to 80% of the maximum emittable torque.

In the second angular region WB2, the torque is limited to a set maximum torque which corresponds to 100% and the maximum torque required by the windscreen wiper device 1. This region therefore extends beyond the region of the maximum torque required.

In the third angular region WB3, the emittable torque is again lowered to 8 0% of the maximum emittable torque.

Finally in the fourth angular region WB4, the torque is limited to around 50% of the maximum emittable torque. This region is located shortly before the reversing point, for example 10 to 15°, and ends at the reversing point in which the gearing 3 or its connected motor crank 4 and the connecting rods 5 are in the upright position.

On reaching the reversing point, in this embodiment example the torque is again limited to the maximum emittable torque but however here too first a reduced range, for example 80%, can be selected. This range corresponds to the fifth angular region WB5. Around 20 to 30° before reaching the turning point, the torque in the sixth angular region WB6 is again limited to 80%, and at around 10% before reaching the turning point of the seventh angular region WB7, to around 50% of the maximum emittable torque.

By taking into account the wiper linkage translation ratio, the system load can be reduced by around 30%. By providing a torque reduction after the motor crank has accelerated out of at least one of the turning points, a further refined adaptation is achieved of the motor power or torque required, enabling a reduction of the maximum system load by a further 10%. This in turn achieves a further reduction in weight and cost.

Figure 3A:
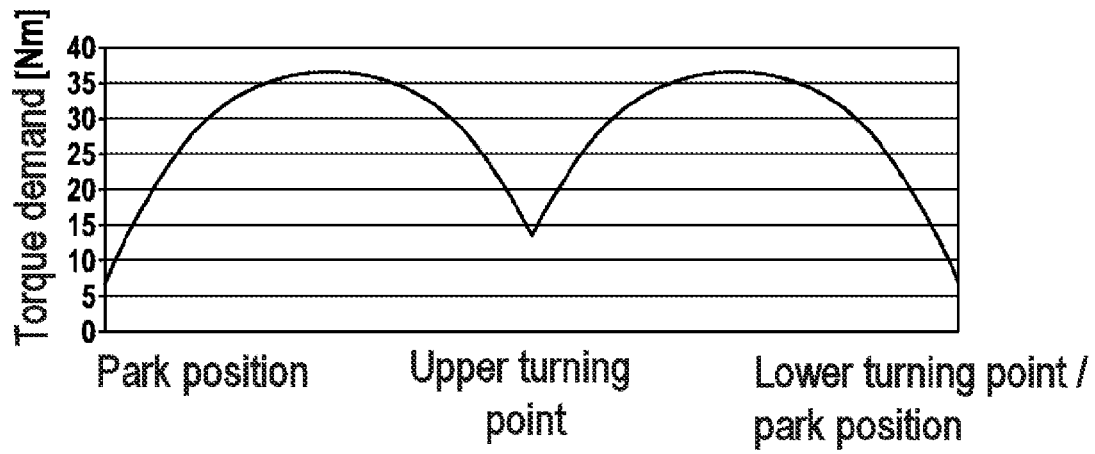
FIGS. 3a-3c—a diagrammatic depiction during a wipe cycle of a windscreen wiper device according to the invention, and FIGS. 4a and 4b—a diagrammatic depiction of the adaptation of the necessary motor torque taking into account the inertia of the wiper motor.
Figure 3B:
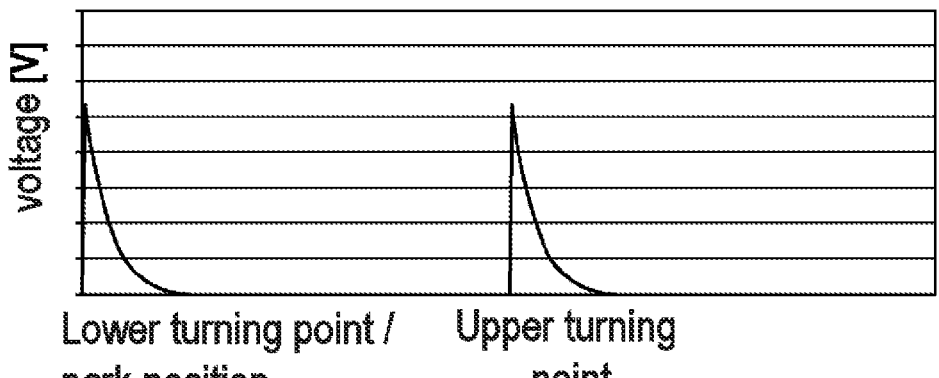
Figure 3C:
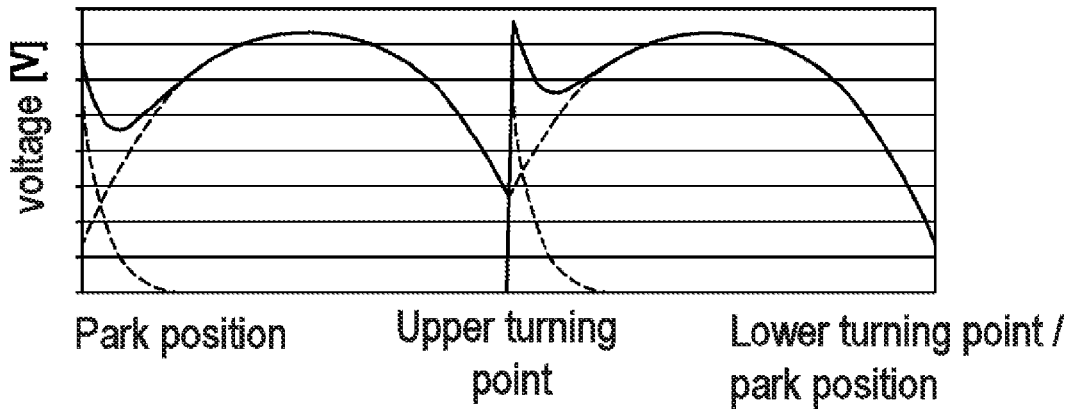

FIGS. 3a to 3c show a torque demand calculated following a torque formula for a windscreen wiper device with reversing motor. The torque demand according to FIG. 3 is calculated according to the torque formula $$M_a = F_{Arm} \cdot L_{Arm} \cdot \mu_{max} \cdot \frac{\omega_{Out}}{\omega_{Mot}}$$

wherein F is the arm force, L the wiper arm length and μ the coefficient of friction of the rubber.

The wiper arm here is first brought from the park position to the upper turning point and from the upper turning point back to the lower turning point or park position. It is therefore a theoretically determined torque demand. It does not take into account the power demand necessary as shown in FIG. 3b on the reversing process at the lower turning point or park position and at the upper turning point. Here an additional voltage is required to overcome the internal motor inertias in the reversing motor and the reversing motor itself which occur in particular on acceleration of the motor crank out of the turning points. If we also take into account in the calculated torque demand the voltage demand from the internal motor inertias, the total demand for motor power or torque is that shown in FIG. 3c. The voltage peak in FIG. 3c can be absorbed well by the windscreen wiper device since here the system load is kept lower on blocking.

Figure 4A:
Figure 4B:
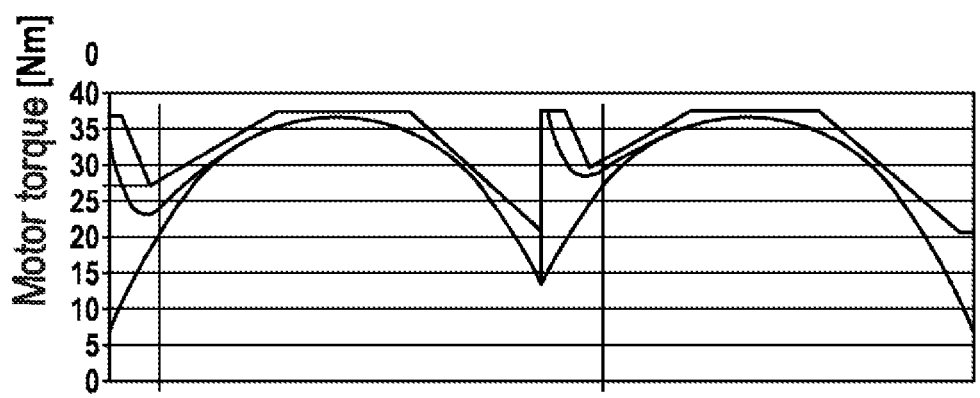

In order now to be able to control the reversing motor as well as possible via the control unit according to the invention with the curve stored therein and come as close as possible to the actual motor power demand or the torque required, the curve stored in the control unit must be adapted as closely as possible to the actual voltage curve. FIGS. 4a and 4b show accordingly a curve for a torque demand calculated purely according to the torque formula (FIG. 4a) and a curve which is based on a motor power total demand overlaid with a voltage demand because of internal motor inertias (FIG. 4b).

As evident from the diagram, it is thus possible in the critical end positions of the blockades, in relation to the upward wiping movement, to reduce the motor torque from 33-36 Nm (FIG. 4a) to 27-29 Nm (FIG. 4b). This corresponds to a reduction of system load of around 30%. This reduction is attributable solely to determining the curve taking into account the mass inertia of the reversing motor and the electronically controlled torque limitation in the turning points based on taking into account the wiper linkage translation ratio. The use of torque reduction only after the motor crank has accelerated out of the turning points allows a further refined adaptation of the motor power. A reduction in maximum system load by a further 10% is possible for example by taking into account the elasticity of the individual components of the windscreen wiper device.

The invention claimed is:

1. A windscreen wiper device (1) for a motor vehicle with at least one wiper motor (2) having a motor crank (4) connected with at least one gearing (3) downstream of the wiper motor in order to drive a wiper arm coupled therewith such that said arm executes an oscillating wiping movement on a windscreen of the motor vehicle, wherein the wiper motor is coupled with a control unit which adjusts a motor power generated by the wiper motor (2) as a function of a translation ratio resulting from the position of the gearing (3), characterized in that to generate as uniform a wiper arm movement as possible on the windscreen during a dynamic reversing process of the wiper arm out of a turning point, the control unit maintains a level of motor power until after the motor crank (4) has accelerated out of the respective wiper arm turning point.

2. The windscreen wiper device (1) as claimed in claim 1, characterized in that to reduce the motor power or torque of the wiper motor (2), a torque/power curve is stored in the control unit which constitutes an approximation of the motor moment demand curve.

3. The windscreen wiper device (1) as claimed in claim 1, characterized in that the motor power of the wiper motor (2) is reduced by limiting the current.

4. The windscreen wiper device (1) as claimed in claim 1, characterized in that the wiper motor (2) is controlled electronically and has a position and rotation direction detection.

5. The windscreen wiper device (1) as claimed in claim 1, characterized in that it comprises at least one sensor arrangement to determine the position and rotation direction of the gearing (3) or of the wiper arm on the windscreen.

6. The windscreen wiper device (1) as claimed in claim 1, characterized in that the control unit is ready for operation in all operating states of the windscreen wiper device (2) and is activated on detection of even low rotation speeds of the wiper motor (2).

7. A method for controlling a windscreen wiper device (1) for a motor vehicle, with at least one wiper motor (2) on which is provided a motor crank (4) which is connected with at least one gearing (3) downstream of the wiper motor (2) to drive a wiper arm coupled therewith such that it executes an oscillating wiping movement on a windscreen of the motor vehicle, wherein the motor wiper (2) is coupled with a control unit which adjusts a motor power generated by the wiper motor (2) as a function of a translation ratio resulting from the position of the gearing (3) to adapt the motor power and a torque acting on the gearing (3) or wiper arm to the power required to execute the wiping movement of the wiper arm, characterized in that to generate as uniform a wiper arm movement as possible on the windscreen, during a dynamic reversing process of the wiper arm out of its turning point a level of motor power is maintained until after the motor crank (4) or wiper arm has accelerated out of its turning point.

8. The method for controlling a windscreen wiper device (1) for a motor vehicle as claimed in claim 7, characterized in that the control unit takes into account the inertia of the wiper motor (2) in determining the torque to be applied by the wiper motor (2) to the motor crank (4).

9. The method for controlling a windscreen wiper device (1) as claimed in claim 8, characterized in that the elasticity of individual components of the windscreen wiper device (1) is taken into account.

10. The windscreen wiper device (1) as claimed in claim 1, wherein the at least one wiper motor (2) is a reversing motor.

11. The windscreen wiper device (1) as claimed in claim 1, characterized in that the motor power of the wiper motor (2) is reduced by limiting the voltage.

12. The windscreen wiper device (1) as claimed in claim 1, characterized in that the wiper motor (2) is controlled electronically and has a position detection.

13. The windscreen wiper device (1) as claimed in claim 1, characterized in that the wiper motor (2) is controlled electronically and has a rotation direction detection.

14. The windscreen wiper device (1) as claimed in claim 1, characterized in that it comprises at least one sensor arrangement to determine the position and rotation direction of the gearing (3) on the windscreen.

15. The windscreen wiper device (1) as claimed in claim 1, characterized in that it comprises at least one sensor arrangement to determine the position and rotation direction of the wiper arm on the windscreen.

16. The windscreen wiper device (1) as claimed in claim 1, characterized in that it comprises at least one sensor arrangement to determine the position of the gearing (3) or of the wiper arm on the windscreen.

17. The windscreen wiper device (1) as claimed in claim 1, characterized in that it comprises at least one sensor arrangement to determine the rotation direction of the gearing (3) or of the wiper arm on the windscreen.

18. A windscreen wiper device (1) for a motor vehicle, as claimed in claim 1, with at least one wiper motor (2) on which is provided a motor crank (4) which is connected with at least one gearing (3) downstream of the wiper motor (2) to drive a wiper arm coupled therewith such that it executes an oscillating wiping movement on a windscreen of the motor vehicle, wherein the motor wiper (2) is coupled with a control unit which adjusts a motor power generated by the wiper motor (2) as a function of a translation ratio resulting from the position of the gearing (3) to adapt the motor power and a torque acting on the gearing (3) to the power required to execute the wiping movement of the wiper arm, characterized in that to generate as uniform a wiper arm movement as possible on the windscreen, during dynamic reversing processes of the wiper arm out of its turning points a reduction in motor power is delayed until after the motor crank (4) or wiper arm has accelerated out of at least one of its turning points of the wiper arm.

19. A windscreen wiper device (1) for a motor vehicle, as claimed in claim 1, with at least one wiper motor (2) on which is provided a motor crank (4) which is connected with at least one gearing (3) downstream of the wiper motor (2) to drive a wiper arm coupled therewith such that it executes an oscillating wiping movement on a windscreen of the motor vehicle, wherein the motor wiper (2) is coupled with a control unit which adjusts a motor power generated by the wiper motor (2) as a function of a translation ratio resulting from the position of the gearing (3) to adapt the motor power and a torque acting on the wiper arm to the power required to execute the wiping movement of the wiper arm, characterized in that to generate as uniform a wiper arm movement as possible on the windscreen, during dynamic reversing processes of the wiper arm out of its turning points a reduction in motor power is delayed until after the motor crank (4) or wiper arm has accelerated out of at least one of its turning points of the wiper arm.

\* \* \* \* \*